United States Patent [19]

Vermeer

[11] Patent Number: 5,291,528
[45] Date of Patent: Mar. 1, 1994

[54] CIRCUIT FOR GLITCH-FREE SWITCHING OF ASYNCHRONOUS CLOCK SOURCES

[75] Inventor: Fulps V. Vermeer, Delft, Netherlands
[73] Assignee: NCR Corporation, Dayton, Ohio
[21] Appl. No.: 865,513
[22] Filed: Apr. 9, 1992

[30] Foreign Application Priority Data

May 1, 1991 [GB] United Kingdom ............... 9109445

[51] Int. Cl.$^5$ .............................................. H04L 7/00
[52] U.S. Cl. .................................... 375/106; 304/269; 328/63; 328/72
[58] Field of Search ................ 375/38, 106; 307/269; 328/63, 137, 154, 72; 331/49, 55

[56] References Cited

U.S. PATENT DOCUMENTS

| | | | |
|---|---|---|---|
| 4,398,155 | 8/1983 | Atwell, Jr. et al. | 375/107 |
| 4,419,629 | 12/1983 | O'Brien | 328/72 |
| 4,560,939 | 12/1985 | DeKarske et al. | 328/72 |
| 4,853,653 | 8/1989 | Maher | 328/137 |
| 4,870,299 | 9/1989 | Chen | 307/269 |
| 4,899,351 | 2/1990 | Bonke | 375/108 |
| 4,965,524 | 10/1990 | Patchen | 328/154 |
| 5,099,141 | 3/1992 | Utsunomiya | 328/137 |
| 5,155,380 | 10/1992 | Hwang et al. | 307/269 |

*Primary Examiner*—Stephen Chin
*Assistant Examiner*—T. Ghebretinsae
*Attorney, Agent, or Firm*—Jack R. Penrod

[57] ABSTRACT

A circuit, including a state machine, e. g. a logic array and a set of controlled storage devices, receives conditioning signals, such as reset, power failure signals and signals fed back from the storage devices, and uses the signals to determine which of a number of clock sources is to be used in a system. The state machine provides output signals which are processed by a delay circuit to ensure that switches between clock sources only occur during an inactive period of the clock signals to prevent signal glitches. The circuit's output signal controls a number of AND gates, each of which gates a particular clock signal to an output line. When a power fail condition occurs, a switch between a first clock signal and a substantially lower frequency clock signal is required to conserve power. This is achieved by first switching to a synchronized lower frequency clock signal, and then to a non-synchronized lower frequency clock signal when the first clock signal is switched off since the synchronized low frequency clock signal is lost at this time when the clock source from which the first signal is generated is switched off to conserve power. A reverse process switches back to the high frequency clock without glitches when power returns.

8 Claims, 5 Drawing Sheets

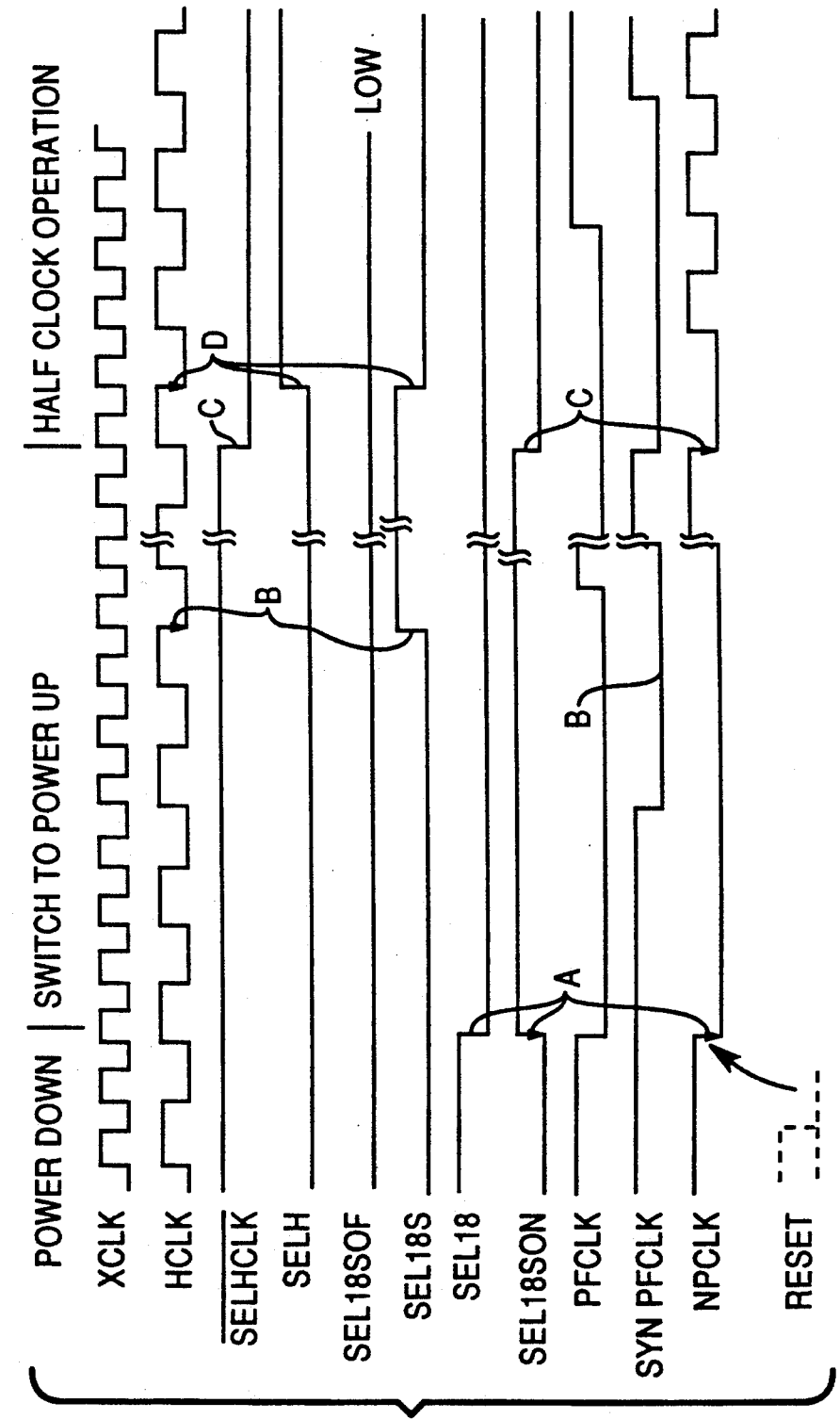

FIG. 4

| | OUTPUT, CURRENT STATE | | | | | | INPUT TO STATE MACHINE | | | | | OUTPUT, NEW STATE | | | | | | NAME |
|---|---|---|---|---|---|---|---|---|---|---|---|---|---|---|---|---|---|---|
| NAME | SELXCLK | $\overline{SELHCLK}$ | SEL18 | SEL18ON | SEL18OF | EB | RST | CT | PF | SEL18ON3 | SEL18OF2 | SELXCLK | $\overline{SELHCLK}$ | SEL18 | SEL18ON | SEL18OF | EB | |
| POWER ON STATE | 0 | 0 | 0 | 0 | 0 | 0 | 1 | x | x | x | x | 0 | 0 | 0 | 0 | 0 | 0 | POWER ON STATE |
| HALF CLOCK OPERATION | 0 | 0 | 0 | 0 | 0 | 0 | 0 | 0 | x | x | x | 0 | 0 | 0 | 0 | 0 | 1 | HALF CLOCK OPERATION |
| SWITCH TO POWER DOWN | 0 | 0 | 0 | 0 | 0 | 1 | x | x | 0 | x | x | 0 | 0 | 0 | 0 | 0 | 1 | SWITCH TO POWER DOWN |
| SWITCH TO POWER DOWN | 0 | 0 | 0 | 0 | 0 | 1 | x | x | 1 | x | x | 0 | 1 | 0 | 0 | 1 | 0 | POWER DOWN STATE |
| POWER DOWN STATE | 0 | 1 | 0 | 0 | 1 | 0 | 0 | x | x | x | 0 | 0 | 1 | 0 | 0 | 1 | 0 | POWER DOWN STATE |
| POWER DOWN STATE | 0 | 1 | 0 | 0 | 1 | 0 | 1 | x | x | x | 1 | 0 | 1 | 1 | 0 | 0 | 0 | SWITCH TO POWER UP |
| SWITCH TO POWER UP | 0 | 1 | 1 | 0 | 0 | 0 | 1 | x | x | x | x | 0 | 1 | 1 | 0 | 0 | 0 | SWITCH TO POWER UP |
| SWITCH TO POWER UP | 0 | 1 | 1 | 0 | 0 | 0 | 0 | x | x | x | x | 0 | 1 | 0 | 1 | 0 | 0 | (transition) |
| (switch to power up) | 0 | 1 | 0 | 1 | 0 | 0 | x | x | x | 0 | x | 0 | 1 | 0 | 1 | 0 | 0 | |
| (switch to power up) | 0 | 1 | 0 | 1 | 0 | 0 | x | x | x | 1 | x | 0 | 0 | 0 | 0 | 0 | 1 | HALF CLOCK OPERATION |

NPCLK RISING EDGE →

NOTE: x = LOGIC LEVEL IRRELEVANT

CIRCUIT FOR GLITCH-FREE SWITCHING OF ASYNCHRONOUS CLOCK SOURCES

The present invention relates to a circuit for switching between a first clock source and a second, substantially lower frequency, asynchronous, clock source for the purpose of conserving power without generating spurious pulses, hereinafter referred to as glitches, during such switching.

The present invention finds utility, for example, in the use of state machines which have to remain operational when switching from one clock source to another clock source. A state machine is a set of flip-flops holding a current state, and a logic array which is responsible for generating the next state to be stored by the flip-flops on the next clock cycle. A switch between clock sources is required, for example, when a lower clock speed is required for a power-down mode or if a power failure occurs.

It is an object of the invention to provide a circuit for switching between asynchronous clock sources without generating glitches.

It is a further object of the invention to switch a logic device to a substantially lower frequency clock source to conserve power.

SUMMARY OF THE INVENTION

Briefly stated, in accordance with one aspect of the invention, the aforementioned objects are achieved by providing a switching circuit for switching from a first clock signal of a first frequency to another clock signal of another frequency that is asynchronous from said first frequency without causing spurious signals.

In another aspect of the invention, the switching circuit includes a synchronizing device for synchronizing the second clock signal to the first clock signal and providing at an output thereof a third clock signal that has a frequency that is the same as the second frequency and is synchronous to the first clock signal. A switching device is connected to the synchronizing device for switching from the first clock signal to the third clock signal during an inactive portion of the first clock signal. A second switching device is connected to the synchronizing device and the first switching device for switching from the third clock signal to the second clock signal during an inactive portion of the third clock signal. Since the switching from the first to the third and the third to the second is controlled to occur during inactive portions of the clock signals, spurious signals are not generated.

BRIEF DESCRIPTION OF THE DRAWINGS

FIG. 3 shows a diagram of the signals generated by the circuit of FIGS. 1A and 1B, when switching from the second to the first clock source; and FIG. 4 shows a truth table of the input and output logic conditions for the circuit of FIGS. 1A and 1B.

DESCRIPTION OF A PREFERRED EMBODIMENT

Figure 1A:
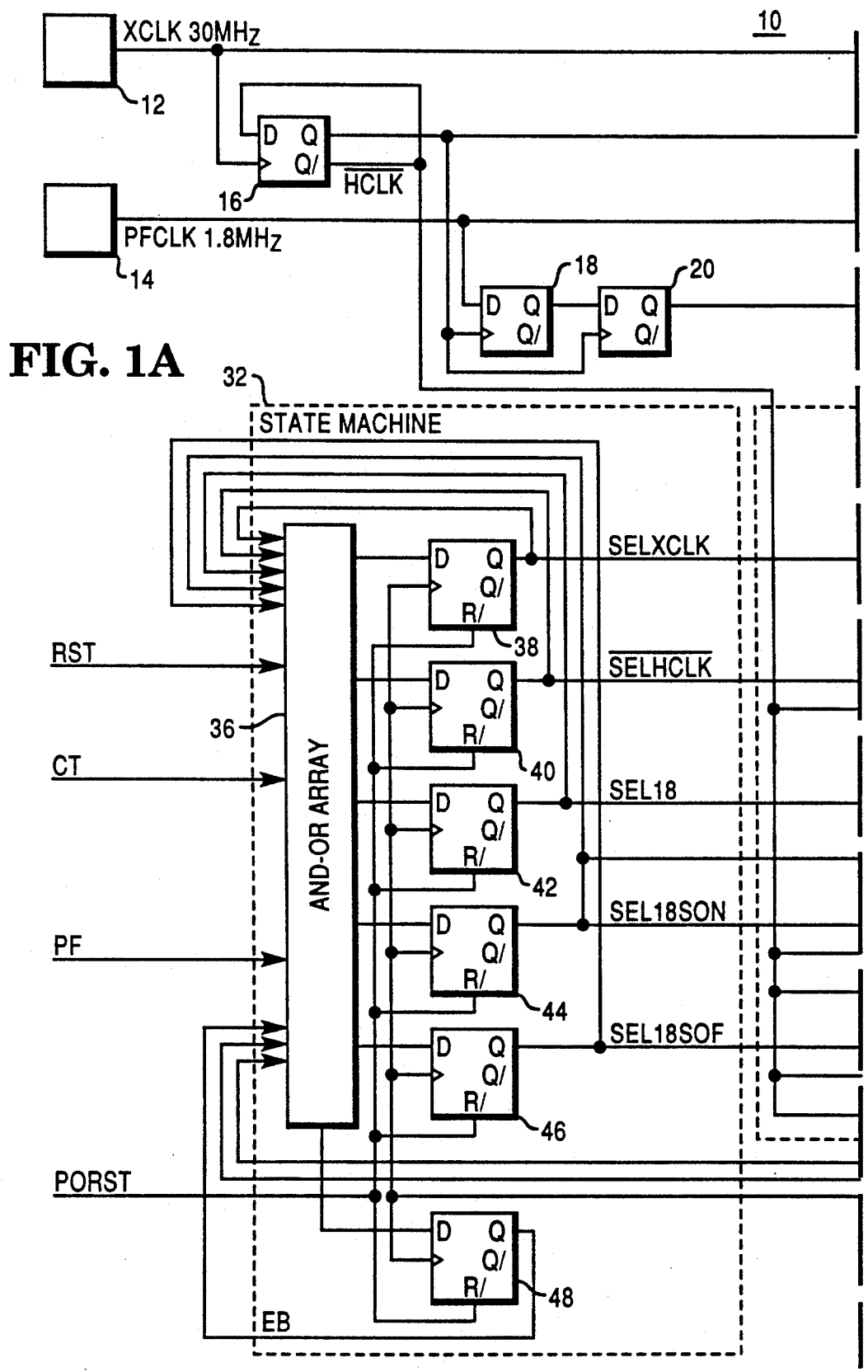
FIGS. 1A and 1B when joined together provide a block diagram of a switching circuit according to the invention.
Figure 1B:
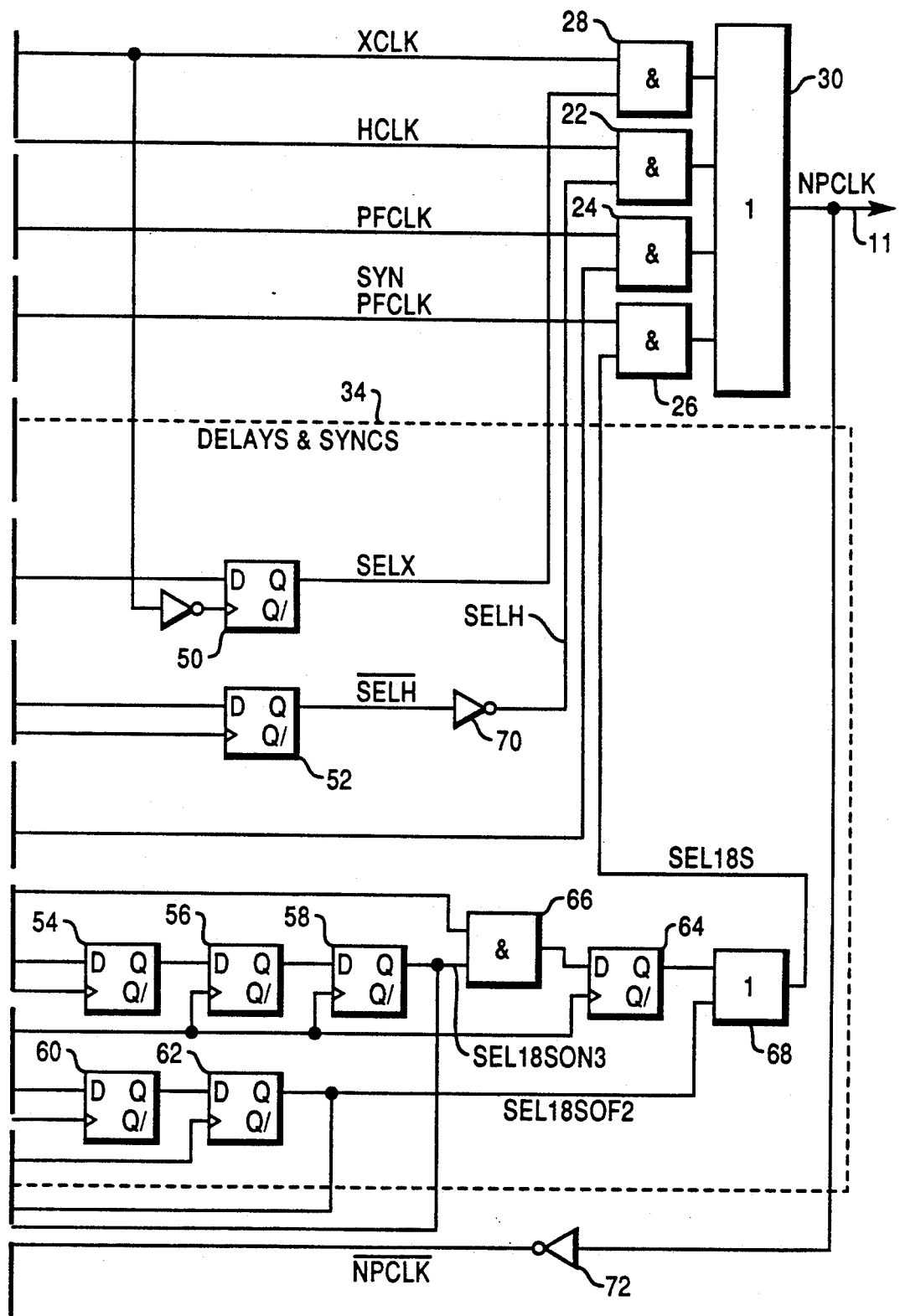

Referring to FIGS. 1A and 1B, the switching circuit 10 is shown for switching to an output line 11 any one of the following signals, namely: signal XCLK which is a 30 MHz signal and represents full clock operation; signal HCLK which is a 15 MHz signal and represents half clock operation; signal PFCLK which is a 1.8 MHz signal and is a power fail clock signal used when a power fail occurs; and signal SYN PFCLK which is the power fail clock signal synchronized to the signal HCLK.

The output line 11 may be connected to various items such as a number of processors operating at either full clock (30 MHz) or half clock (15 MHz) speeds. During a power failure condition it becomes necessary to switch from the clock signal currently in use, XCLK or HCLK, to the power failure clock signal PFCLK and then back to the clock signal originally in use.

It will be appreciated that in the following description, an inactive state of a signal is when the signal is in a low state, corresponding to a zero voltage level, and an active state of a signal is when the signal is in a high state, corresponding to a positive voltage level.

The circuit 10 as shown in FIGS. 1A and 1B controls the switching between the clock signals and will now be described.

A state machine 32 comprises an AND-OR logic array 36 connected to a number of flip-flops 38 to 48. The flip-flops 38 to 48 are reset by a power-on reset signal PORST, and are driven by the inverse of the clock NPCLK appearing on the output line 11 of the switching circuit. The logic array 36 is well known in the art and is therefore not described in further detail. The logic array 36 receives a reset signal RST, a power failure signal PF, a signal CT indicating whether the processor currently in operation is operating at 30 MHz or 15 MHz, and an output signal from each of the flip-flops 38 to 48. The state machine 32 is connected to a delay and synchronization circuit 34 which comprises flip-flops 50 to 64, an AND gate 66 and an OR gate 68, all of the flip-flops 50 to 64 being clocked by the inverse of the half clock signal HCLK. The purpose of the circuit 34 is to ensure that the signals which it produces are generated at predetermined times to ensure that a switch between the clock signals only occurs during an inactive period of the clock signal currently in use.

It will be seen that the flip-flop 38 generates a signal SELXCLK, which is applied to the input of flip-flop 50, the output of which is connected to an input of an AND gate 28 for the application of a control signal SELX thereto. The flip-flop 40 generates a signal $\overline{\text{SELHCLK}}$ which is applied to the input of flip-flop 52, is connected to an input of an AND 22 via an inverter 70 for the application of a control signal SELH thereto. The flip-flop 42 is connected directly to an input of an AND gate 24 for the application of a control signal SEL18 thereto. The flip-flop 44 is connected to a serially connected flip-flop chain 54 to 58 for the application of signal SEL18SON thereto. The output of flip-flop 58 is connected to a first input of an AND gate 66, and the output of flip-flop 44 is connected to a second input of the AND gate 66. The output of the AND gate 66 is connected to a flip-flop 64 which is controlled by the clock signal $\overline{\text{HCLK}}$. The output of flip-flop 64 is connected to an OR gate 68 which generates a signal SEL18S for controlling an AND gate 26 to which it is connected.

The output of flip-flop 46 is connected to the input of flip-flop 60, the output of which is connected to flip-flop 62. The output of flip-flop 62 is connected to a further input of the OR gate 68 which as mentioned above generates signal SEL18S. The flip-flops 54–58, AND gate 66 and OR gate 68 are used during a power up mode, and the flip-flops 60–62 and OR gate 68 are used during a power down mode.

The flip-flop 48 generates an output signal which is fed back to an input of the logic array 36. This signal is identified as an extra bit signal EB, and is used by the state machine to distinguish between a power on state and half or full clock operation.

The logic array 36 also receives signals from the outputs of flip-flops 58 and 62.

Thus, the circuit 34 is connected to first inputs of the four AND gates 22 to 28 each receiving a respective signal from the circuit 34, as mentioned above. A second input of the AND gate 28 is connected to a 30 MHz clock source 12, generating the signal XCLK. A second input of the AND gate 22 is connected to the clock source 12, by way of a flip-flop 16 which divides the 30 MHz clock source by a factor of two, thereby providing a source of 15 MHz clock signals HCLK. A second input of the AND gate 24 is connected to a 1.8 MHz clock source 14, generating the signal PFCLK. A second input of the AND gate 26 is connected to the 1.8 MHz clock source 14 by way of two flip-flops 18, 20, serially connected and clocked by the 15 MHz clock signal HCLK to synchronize the resulting 1.8 MHz signal SYN PFCLK with a rising edge of the 15 MHz clock signal, HCLK. The outputs of AND gates 22 to 28 are connected to a selection means 30, e. g. an OR gate, which passes one of the clock signals to the output line 11, said signal being referred to as a resultant clock NPCLK. The output line 11 is connected to the state machine 32, by way of an inverter 72 to provide the clock source for flip-flops 38 to 48.

The operation of the circuit shown in FIGS. 1A and 1B will now be described with reference to FIGS. 2, 3 and 4 in relation to switching from the 15 MHz clock signal to the 1.8 MHz power fail clock signal and back to the 15 MHz signal. It will be appreciated that the operation is similar with respect to the 30 MHz clock signal, where signal SELXCLK is used instead of signal $\overline{\text{SELHCLK}}$, and signal SELX is used instead of signal SELH.

Figure 2:
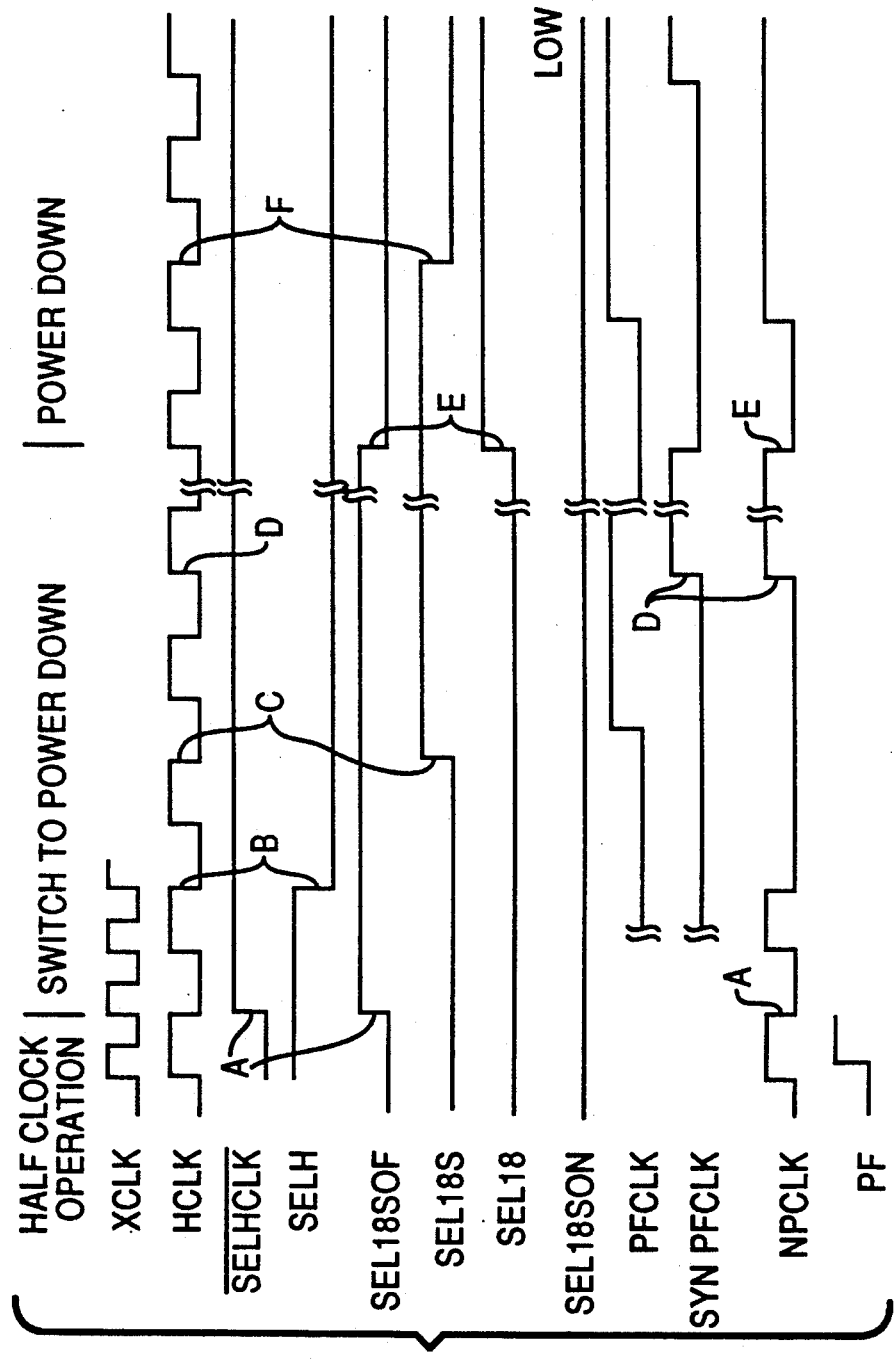
FIG. 2 shows a diagram of the signals generated by the circuit of FIGS. 1A and 1B, when switching from a first to a second clock source.

In FIG. 2, the timing relationship of the waveforms generated by the circuit of FIGS. 1A and 1B is shown, when switching from an operational clock signal of 15 MHz to the power down mode where the 1.8 MHz signal is used.

In FIG. 3, the timing relationship of the waveforms generated by the circuit of FIGS. 1A and 1B is shown, when switching from the power down mode to the power up mode where the 15 MHz operational clock signal is used.

FIG. 4 shows the truth table for the input and output conditions of the state machine 32. The column identified as OUTPUT, CURRENT STATE shows the current logic condition of the output signals from the flip-flops 38 to 48. These signals are applied to the logic array 36 as input signals. The column identified as INPUT TO STATE MACHINE shows the logic condition of the other input signals applied to the logic array 36. The column identified as OUTPUT, NEW STATE represents the new logic state of the output flip-flops 38 to 48 when the flip-flops 38 to 48 are clocked by the next rising edge of the inverse resultant clock signal NPCLK which is produced from the signal NPCLK fed back from the output line 11 and inverted by the inverter 72. It will be appreciated that this new output logic state becomes the current output logic state and appears on the succeeding line of the OUTPUT CURRENT STATE column. The left and right hand columns identified as NAME, depict the state in which the state machine 32 is in as dictated by the logic states. It will be seen that a POWER ON STATE occurs when the current output of the flip-flops 38 to 48 are in a logic zero state and the reset signal RST is in a logic one state. The state of the other input signals are irrelevant at this time. These conditions maintain the output of flip-flops 38 to 48 in their logic zero state as shown in the OUTPUT, NEW STATE column. When the signals RST and CT go to a logic zero state, this causes the output of flip-flop 48 to go to the logic one state which signifies that half clock operation is required and the 15 MHz clock signal HCLK is gated to the output line 11 by the AND gate 22 and the OR gate 30. The AND gate 22 is controlled by the signal $\overline{\text{SELHCLK}}$ generated by flip-flop 40 which is in the logic zero state, and passed through flip-flop 52 on the next occurrence of clock signal $\overline{\text{HCLK}}$, and inverted to a logic one state by the inverter 70.

When half clock operation is entered, the state of the power fail signal becomes relevant and half clock operation is maintained providing the power failure signal PF does not go to a logic one (active) state during a period when the signal NPCLK is in a logic one state. At this time the state of the signals RST and CT are irrelevant while the output signals from the flip-flops 38 to 48 remain unchanged.

Upon the occurrence of a power failure, the signal PF goes to the logic one state which forces the outputs of flip-flops 40, 46 and 48, $\overline{\text{SELHCLK}}$, SEL18SOF, and EB respectively, to change state on the next negative going edge of signal NPCLK. This is shown at A in FIG. 2. This causes signal SELH to go to the logic zero state, one clock cycle later (with reference to the HCLK signal) as determined by flip-flop 52, on the next falling edge of the clock signal HCLK. This is shown at B on FIG. 2. The current state of signal SELH causes the AND gate 22 to be disabled, thereby removing the signal HCLK from the output line 11. The changing state of signal SEL18SOF causes the signal SEL18S to go to the logic one state after a delay of two clock cycles caused by flip-flops 60, 62, as shown at C in FIG. 2. This causes the AND gate 26 to be enabled, and the signal SYN PFCLK is applied to the output line 11, and becomes the resultant clock NPCLK as shown at D in FIG. 2. The new output states of flip-flops 38 to 48 are fed back as inputs to the state machine, which together with the signal RST and the signal SEL18SOF2 from flip-flop 62, which are in logic zero state, maintain this condition. When signal RST and signal SEL18SOF2 go to the logic 1 state, signals SEL18 and SEL18SOF go to the logic one and zero state respectively as shown at E in FIG. 2, which causes the AND gate 24 to be enabled and to permit the 1.8 MHz signal PFCLK to be applied to the output line 11 and become the resultant clock NPCLK. The disabling of AND gate 26 occurs at F in FIG. 2, and is delayed by the flip-flops 60 and 62 which means that for a brief period of time both the signals PFCLK and SYN PFCLK are applied to the OR gate 30. It will be noted that during this period the signal SYN PFCLK is in the logic zero state, which effectively means that only the signal PFCLK appears on the output line 11.

During the period of power down, the clock source 12 may be switched off to conserve power, but must be switched on again before switching to power up.

The power down state is maintained until the reset signal RST goes to the logic zero state. This forces the state machine into the next state on the next falling edge of the clock signal NPCLK, which causes the signal SEL18 to go to the logic zero state therefore disabling the AND gate 24. The signal SEL18SON goes to the logic state indicating that a switch to power up is required. This is shown at A in FIG. 3. The output signal SEL18SON3 generated by the flip-flop 58 remains in the logic zero state until the logic one condition of signal SEL18SON is passed through the flip-flops 54 to 58, three clock cycles later. When the signal SEL18SON3 goes to the logic one state, the signal is delayed a further period of one clock cycle of the signal HCLK, caused by flip-flop 64, causing the signal SEL18S to go to the logic one state to switch on the AND gate 26 and permit the signal SYN PFCLK during its low period to be applied to the output line 11. This is shown at B in FIG. 3. On the first negative going edge of the signal NPCLK, while signal SEL18SON3 is in the logic one state the state machine enters its next state, as shown at C in FIG. 3. At this time signals CT and SEL18SOF2 are in the logic zero state. The output of flip-flop 44, signal SEL18SON, goes to the logic zero state, and the output of flip-flop 48, signal EB, goes to the logic one state. The output of flip-flop 40, signal SELHCLK, goes to the logic zero state causing the signal SELH to go to the logic one state which opens AND gate 22. The AND gate 26 is closed by signal SEL18S going to the logic zero state. This permits the clock signal HCLK to be applied to the output line 11 as the resultant clock during a low period of signal SYN PFCLK. This is shown at D in FIG. 3, and the return to the operating signal frequency of 15 MHz, HCLK, is accomplished.

Thus, it will be appreciated that when it becomes necessary to switch from the 15 MHz signal HCLK to the asynchronous 1.8 MHz signal PFCLK, glitches are avoided by switching to a synchronized 1.8 MHz signal SYN PFCLK before switching to the asynchronous 1.8 MHz signal PFCLK during the inactive period of the clock signals. Similarly, when switching back to the 15 MHz signal HCLK, the synchronized 1.8 MHz signal SYN PFCLK is selected before switching to the 15 MHz signal HCLK, again during the inactive period of clock signals to avoid glitches.

It will further be appreciated that the same procedure is adopted when switching from the 30 MHz signal XCLK to the asynchronous 1.8 MHz signal PFCLK and back to the 30 MHz signal XCLK. In this case the signals SELXCLK and SELX are used in place of the signals SELHCLK and SELH, and the signal XCLK is used in place of the signal HCLK.

It will also be appreciated that it is possible to switch directly between the 15 MHz signal HCLK, and the 30 MHz signal XCLK, because these signals are synchronized. This is achieved by switching the signal HCLK off and the signal XCLK on during their first inactive period, by running the state machine 32 on the falling edge of the resultant clock NPCLK and synchronizing the switch to the clock signal XCLK to the falling edge of the clock signal XCLK.

Thus, it will now be understood that there has been disclosed a new and novel glitch-free clock source switching circuit which includes at least two asynchronous clock sources of different frequencies. While the invention has been particularly illustrated and described with reference to a preferred embodiment thereof, it will be understood by those skilled in the art that various changes in form, details, and applications may be made therein. For example the above description is directed to switching occurring during the inactive low period of clocks, and it will be appreciated that, by changing the logic, a high period of clock could be used as the inactive period. It is accordingly intended that the appended claims shall cover all such changes in form, details and applications which do not depart from the true spirit and scope of the invention.

What is claimed as new and desired to be secured by Letters Patent of the United States is;

1. A switching circuit for selectively switching to an output line a first clock signal from a first clock source or a second clock signal from a second, lower frequency clock source, said second clock signal being asynchronous with respect to said first clock signal, comprising:
   synchronizing means connected to said first and second clock sources for providing a third clock signal having the same frequency as said second clock signal and synchronized with said first clock signal at an output thereof;
   gating means connected between said output line and the outputs of said first and second clock sources and said synchronous means; and
   control means connected to said gating means for controlling the operation thereof such that if said second clock signal is switched to said output line in place of said first clock signal, said third clock signal is gated to said output line during an inactive period of said first clock signal and causes said second clock signal to be gated to said output line during an inactive period of said third clock signal, said first clock source being rendered non-operational following its disconnection from said output line, and if said first clock signal is switched to said output line in place of said second clock signal said first clock source is rendered operational following which said third clock signal is gated to said output line during an inactive period of said second clock signal, and then said first clock signal is gated to said output line during an inactive period of said third clock signal.

2. A switching circuit according to claim 1, wherein said control means includes an AND-OR logic array having output flip-flops driven by a logical complement of the currently selected clock signal.

3. A circuit according to claim 1, wherein said control means implements the following truth table:

| | OUTPUT, CURRENT STATE | | | | | INPUT TO STATE MACHINE | | | | |
|---|---|---|---|---|---|---|---|---|---|---|
| NAME | SELXCLK | SELHCLK | SEL18 | SEL18SON | SEL18SOF | EB | RST | CT | PF | SEL18SON3 | NAME |
| POWER ON | 0 | 0 | 0 | 0 | 0 | 0 | 1 | x | x | x | POWER ON STATE |

-continued

| | | | | | | | | | | | |
|---|---|---|---|---|---|---|---|---|---|---|---|
| STATE | 0 | 0 | 0 | 0 | 0 | 0 | 0 | 0 | x | x | HALF |
| HALF | 0 | 0 | 0 | 0 | 0 | 1 | x | x | 0 | x | CLOCK |
| CLOCK | | | | | | | | | | | OPERATION |
| OPERATION | 0 | 0 | 0 | 0 | 0 | 1 | x | x | 1 | x | SWITCH |
| SWITCH | 0 | 1 | 0 | 0 | 1 | 0 | 0 | x | x | x | TO POWER |
| TO POWER | | | | | | | | | | | DOWN |
| DOWN | 0 | 1 | 0 | 0 | 1 | 0 | 1 | x | x | x | POWER |
| POWER | 0 | 1 | 1 | 0 | 0 | 0 | 1 | x | x | x | DOWN |
| DOWN | | | | | | | | | | | STATE |
| STATE | 0 | 1 | 1 | 0 | 0 | 0 | 0 | x | x | x | SWITCH |
| SWITCH | 0 | 1 | 0 | 1 | 0 | 0 | x | x | x | 0 | TO POWER |
| TO POWER | | | | | | | | | | | UP |
| UP | 0 | 1 | 0 | 1 | 0 | 0 | x | 0 | x | 1 | HALF CLOCK |
| | | | | | | | | | | | OPERATION |

$\overline{\text{NPCLK}}$ RISING EDGE ⟶

| NAME | INPUT TO STATE MACHINE SEL18SOF2 | OUTPUT, NEW STATE SELXCLK | $\overline{\text{SELHCLK}}$ | SEL18 | SEL18SON | SEL18SOF | EB | NAME |
|---|---|---|---|---|---|---|---|---|
| POWER ON | x | 0 | 0 | 0 | 0 | 0 | 0 | POWER ON STATE |
| STATE | x | 0 | 0 | 0 | 0 | 0 | 1 | HALF |
| HALF | x | 0 | 0 | 0 | 0 | 0 | 1 | CLOCK OPERATION |
| CLOCK | | | | | | | | |
| OPERATION | x | 0 | 1 | 0 | 0 | 1 | 0 | SWITCH |
| SWITCH | 0 | 0 | 1 | 0 | 0 | 1 | 0 | TO POWER DOWN |
| TO POWER | | | | | | | | |
| DOWN | 1 | 0 | 1 | 1 | 0 | 0 | 0 | POWER |
| POWER | x | 0 | 1 | 1 | 0 | 0 | 0 | DOWN STATE |
| DOWN | | | | | | | | |
| STATE | x | 0 | 1 | 0 | 1 | 0 | 0 | SWITCH |
| SWITCH | x | 0 | 1 | 0 | 1 | 0 | 0 | TO POWER UP |
| TO POWER | | | | | | | | |
| UP | 0 | 0 | 0 | 0 | 0 | 0 | 1 | HALF CLOCK OPERATION |

NOTE: x = LOGIC LEVEL IRRELEVANT

4. A switching circuit according to claim 1 wherein said control means includes a delay and synchronization circuit including a plurality of flip-flops and logic gates.

5. A circuit according to claim 4, wherein said logic gates are connected to selection means including an OR gate, for the purpose of passing the selected clock signal to said output line.

6. A switching circuit according to claim 5, wherein a further clock source outputting a further clock signal is connected to said logic gates, which includes an AND gate having an enabling input connected to said control means, said control means includes two further serially connected flip-flops for controlling the connection of said clock signal to said output line.

7. A switching circuit according to claim 6, wherein said first clock signal is derived from said further clock source via of a flip-flop.

8. A switching circuit according to claim 7, wherein said synchronizing means comprise two further, serially connected flip-flops having their clock inputs connected to a Q-output of the flip-flop that said first clock signal is derived from.

* * * * *